INVENTOR.
ROBERT P. FISCHER
BY
Keith F. Driscoll
AGENT

United States Patent Office
3,560,937
Patented Feb. 2, 1971

3,560,937
APPARATUS FOR INDEPENDENTLY ASSIGNING TIME SLOT INTERVALS AND READ-WRITE CIRCUITS IN A MULTIPROCESSOR SYSTEM

Robert P. Fischer, Norfolk County, Mass., assignor to Honeywell Inc., Minneapolis, Minn., a corporation of Delaware Filed Oct. 28, 1968, Ser. No. 771,147
Int. Cl. G06f *15/16, 15/40*
U.S. Cl. 340—172.5 13 Claims

ABSTRACT OF THE DISCLOSURE

Data processing apparatus responds on a freely assignable basis to each peripheral transfer instruction received from any one of a plurality of processors, and establishes communication between the system memory and the specified peripheral device. The apparatus assigns a read-write control circuit and assigns a plurality of time slot intervals, collectively or independently, to process each request in accordance with the transfer rate of the peripheral device.

BACKGROUND OF THE INVENTION

This invention concerns a data processing system having improved information transfer with peripheral devices. More particularly, it provides apparatus for enabling a multiprogrammed multiprocessor system to execute multiple peripheral handling operations essentially simultaneously. The apparatus has a high degree of flexibility consistent with minimum expenditure of hardware.

Prior art data processing systems employ a variety of arrangements to provide simultaneous communication between plural peripheral devices and a main memory. In general, these arrangements follow two approaches. The first involves the use of plural hardware-oriented I/O channels to perform buffered information transfers between any one peripheral device or processor and a pluplurality of memory modules. Each channel, in this arrangement, is treated as a separate entity and competes with the central processor for memory access. These arrangements often include a switching mechanism for interconnecting one or more peripheral devices to a corresponding member of I/O channels on a first come/first serve basis. As a result, each I/O channel requires control and processing logic for controlling the transfer of data between the peripheral devices and the memory modules independently throughout the data transfer operation.

The second approach, described in Pat. 3,323,110 of R. Fischer and L. Oliari, employs a number of time-sequenced control circuits, included as a portion of the central processing unit, to accommodate plural peripheral devices connected to a common bus (i.e. each peripheral device is physically associated with its communicating bus). Each time-sequenced control circuit includes a pair of storage registers, one of which stores information identifying the area of memory currently being addressed while the other stores the starting address of the memory location from which the particular data transfer is initiated. Further in accordance with this patent, a memory cycle distributor has a cycling time consisting of a plurality of memory sub-intervals. Each sub-interval is associated with one read-write control circuit. The central processing unit has access to memory, for a peripheral device transfer, only when a time interval allocated to a read-write circuit is not required by any peripheral device. This technique recognizes the fact that only a limited number of peripheral devices will be processing information at any one time.

It will also be appreciated that this technique further recognizes that a peripheral device requires access for transferring data with the main memory during only a fraction of the time required for processing the peripheral operation. More specifically, each peripheral data transfer involves vague operational constraints (e.g. mechanical) which prevents the device being used from transferring data at a rate comparable to that of the memory.

The aforementioned transfer rate of a peripheral device is usually established by the mechanical characteristics of the device, and these are variable within certain tolerances. Such mechanical characteristics may involve moving a card through a read station, or moving a magnetic tape or disk past a read-write head. For data communication purposes, the rate is defined by the bit rate of the communications line. Thus, the periods in which data transfers occur are spaced over the duration of the peripheral operation. For example, it may take the processing unit 2 microseconds to execute a two-instruction sequence for transferring a character to a peripheral device. On the other hand, it may take the peripheral device, such as a card punch which operates at a rate of 250 characters per second, 4 milliseconds to punch the character. As a result of this discrepancy, a 2 microsecond interrupt must occur every 4 milliseconds over the time interval required to complete punching the card. Therefore, a memory with a 2 microsecond cycle time can theoretically keep 2000 card punches active simultaneously.

In the arrangement of the of the Fischer and Oliari patent, the limited number of time-sequenced control circuits is directly related to a particular one of a plurality of recurring timing sub-intervals or time slot intervals. This relation is such that upon each occurrence of a timing sub-interval, a peripheral device associated therewith will be recognized. When the device is recognized in this manner, it can transfer information with a memory location addressed by one of the associated control circuits.

Thus, with this patented arrangement, only one of the recurring time sub-intervals or time slot-intervals may be associated with a particular read-write control circuit. Consequently, when it is necessary to service peripheral devices requiring a data transfer rate higher than the rate attainable by the assignment of a single time-sequenced control circuit, it is necessary to interlock two or more sequenced control circuits. This has the effect of assigning two or more time slot-intervals to the peripheral device. This assignment of sequential time slot-intervals guarantees the peripheral device access to memory often enough to keep up with the data transfer rate of the device. This is because the transfer rate provided by such interlocking is equal to the sum of the rates attainable individually with each assigned time sequenced control circuit which in this arrangement can become busy during the servicing of data transfers from a single high speed device. This has the disadvantageous result of restricting the number of peripheral data transfers which can be effected simultaneously.

Further, the above arrangement does not lend itself easily to expansion without increased duplication in hardware. Such extensive expansion is necessary because the system arrangement requires an increased number of demands in order to process peripheral data transfer instructions from a plurality of processors. The type of system expansion may, for example, require the addition of sectors with a plurality of peripheral devices physically associated therewith to accommodate the demands of each processor.

Additionally, in multiprocessor systems it becomes desirable in certain instances to enhance the sharing of peripheral devices between processors, thereby making the devices somewhat independent of the processors. That is somewhat impractical in the foregoing prior arrangement because of the fixed or time-dependent relationship between each read-write control circuit and the time sub-intervals. The arrangement precludes the utilization of one of a limited number of read-write control circuits with any available time slot intervals independently or collectively in any one of a plurality of sectors.

SUMMARY OF THE INVENTION

It is therefore an object of this invention to provide data processing apparatus for use in a multiprogrammed multiprocessor system and operative to assign any one or more of a plurality of time slot intervals independently or collectively in association with any one of a plurality of time-sequenced read-write control circuits. The read-write control circuits will hence be operatively associated with any one of a plurality of peripheral devices and a memory during a data transfer.

It is a further object of the invention to provide apparatus of the above character which assigns a variable number of time slot intervals, and with the number of time slot intervals assigned being a direct function of the optimum transfer rate of the peripheral device.

It is still another object of this invention to provide new and improved apparatus for implementing the foregoing objects and which has essentially minimal hardware.

A preferred embodiment of the invention achieves the foregoing objects by providing data processing apparatus that processes requests from a plurality of processors to transfer data between any one of a plurality of peripheral devices, connected in common with associated ones of the plurality to a plurality of different transfer paths or sectors, and a memory through any one of a limited number of read-write control circuits. The data processing apparatus allocates one or more time slot intervals independently or collectively in accordance with the optimum transfer rate of the requested peripheral device.

The data processing apparatus ascertains the availability of a read-write control circuit specified by a request by referencing a status memory. A searching operation then ascertains whether a sector has sufficient unassigned time slot intervals for accommodating the transfer rate of the peripheral device. The pertinent storage locations of a time slot activity storage table for the sector are addressed; these locations contain a digital representation of the activity status of the time slots within the sector and this informaion is sampled and stored. Also, a register is loaded with a bit configuration in which the number of bits in a selected state specifies the number of unused time slots necessary to accommodate the transfer rate.

With further reference to the preferred embodiment, there is a one-to-one correspondence between the number of time slot intervals associated with the sector and the number of storage locations allocated to a sector within the time slot activity storage able. A bit-by-bit comparison is effected between the contents of the storage locations of the storage table and the initial pattern. Upon each encounter of a "busy" time slot code configuration during each comparison operation, the contents of the register are shifted by one digit to establish a different bit pattern. The searching operation continues until either a "non-busy" time slot bit configuration is located or until all possible code configurations have been tested. When a "non-busy" bit-configuration is located, the time slot intervals are assigned by loading the pertinent information into both status portions of the status memory, status locations of a time slot assignment table, as well as loading the "non-busy" code configuration into the storage locations of the time slot activity storage table.

The time slot assignment table in accordance with the preferred embodiment of the invention includes plural addressable storage locations. The table is cylically operated and its cycling time establishes a plurality of time slot intervals. The same control information is loaded into several locations of the table to permit any one of the plurality of read-write control circuits to be associated with the addressing of one of a plurality of peripheral devices during a particular time slot interval. Upon the completion of the loading operation, the previously selected unused time slot intervals of the sector are now assigned to the particular peripheral device thereby enabling the assigned read-write control circuit to establish communication between memory and the peripheral device at the data transfer rate specified.

Since the allocation of time slot intervals and read-write control circuits is effected somewhat independently, each read-write control circuit is readily assignable to any peripheral device physically associated with a particular sector. This enhances the time-sharing of peripheral devices between processors. It also increases the degree of simultaneity of I/O data transfers because any read-write control circuit can be associated with time slot intervals of any sector. More importantly, since the data processing apparatus may assign a proportional number of unused time slot intervals in each sector by different code combinations in accordance with the transfer rate of the particular peripheral devices, a high degree of flexibility is introduced into the processing of requests. This flexibility is with respect to peripheral devices having disparities in data transfer rates, particularly in the case of peripheral devices having higher data transfer rates than can be accommodated with the assignment of a single time slot interval.

Further, the apparatus handles all requests in a similar fashion, notwithstanding differences in assignment requirements, and hence requires a minimum of duplicating hardware.

The foregoing objects and features which characterize the present invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

BRIEF DESCRIPTION OF THE DRAWINGS

For a fuller understanding of the nature and objects of the invention, reference should be had to the following detailed description taken in connection with the accompanying drawings, in which.

DESCRIPTION OF ILLUSTRATIVE EMBODIMENT

Figure 1:
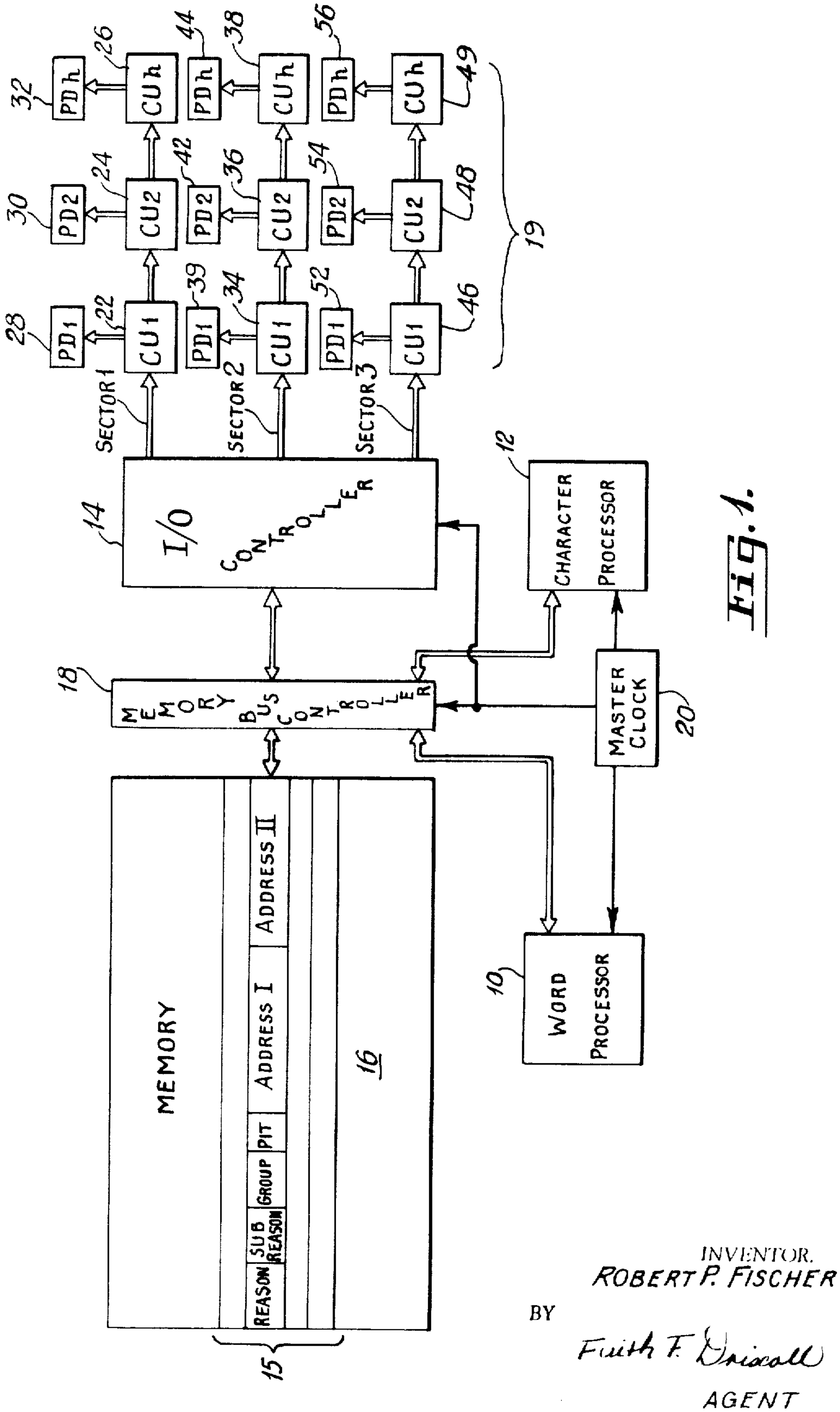
FIG. 1 is a diagrammatic representation in block form of a multiprogrammed multiprocessor data processing system embodying the invention.

Referring to FIG. 1, a multiprogrammed multiprocessor system incorporating the present invention has a word-organized processor 10, a character-organized processor 12 and an input/output (I/O) controller 14. Under the control of a memory bus controller 18 these three elements share a common main memory 16 and operate conventionally under the control of a single monitor program (not shown) termed herein master program group. The memory bus controller 18 handles information transferred between common memory system 16 and each processor 10 and 12 and the I/O controller 14. The illustrator memory 16 may include a plurality of independently operating memory modules (not shown). The memory controller 18 provides simultaneous memory operation by connecting a memory module to any processor in accordance with needs of that processor. The illustrated memory bus controller 18 also includes a master clock 20 generating signals for synchronizing the processors 10 and 12 and the I/O controller 14 with the controller.

The word processor 10 has a multiprogramming capability and can include several program groups, e.g. 8, of control registers for operating as many program groups simultaneously, with each program being handled on a demand basis. Each group of control registers can include sequence counters, index registers, interrupt registers, masking registers, and working registers for directing the execution of the program. The word processor 10 also includes a further group of control registers utilized by the master program group to control interactions between the various processors within the system. The master program group uses the arithmetic unit and the language of the word processor, in contrast to using the language of the character processor, in order to process information on a word basis, which provides a higher rate of computing power than does operation on a character basis. Pat. 3,029,414 of Henry W. Schrimpf entitled "Information Handling Apparatus" describes a system embodying a similar multiprogramming capability.

The character processor 12 operates in a variable length character mode and can process up to four characters at a time. Pat. 3,323,110 of Louis G. Oliari and Robert P. Fischer discloses a processor having this capability. Character processor also has a multiprogramming capability and operates on tasks particularly directed to the editing of I/O data and data communications control.

The I/O controller 14 communicates information between the memory 16 and a plurality of peripheral devices indicated generally at 19. It provides this operation in response to requests received in accordance with the demands of each processor 10 and 12. Upon receiving such a request, the controller 14 assigns a read-write control circuit therein to interconnect the requested peripheral device with main memory during the execution of the transfer operation. Each such read-write control circuit includes a pair of storage registers, one storing information identifying the location in memory 16 currently being addressed by the controller, while the other register stores a starting address of a location in memory 16 from whence the requested data to be transferred is initially stored. The controller 14 communicates with the peripheral devices, both input and output, on a character basis; and communicates with the main memory 16 on a half-word basis, this being the width of the memory modules in memory 16.

To handle large demands for input/output transfers in the multiprocessor system and, particularly, to match more closely the peripheral bus rate (i.e. the rate of information transfer between the I/O controller 14 and the peripheral devices 19) with the rate at which data is transferred from memory 16 to the I/O controller 14, the present system has an expanded peripheral interface. That is, the peripheral devices 19 are organized into sectors 1, 2 and 3 and the devices in each sector are coupled to the I/O controller 14 via a separate transfer bus. Each such sector is physically associated with different peripheral control units $CU_1$-$CU_n$, each of which controls one associated peripheral device $PD_1$–$PD_n$. More specifically, in sector 1, a transfer bus is connected to peripheral control units 22, 24 and 26, each of which is connected to a device 28, 30 and 32 respectively. In sector 2, peripheral control units 34, 36 and 38 connect to peripheral devices 39, 42, 44 and in sector 3, peripheral control units 46, 48, 49 connect to peripheral devices 52, 54, 56.

The I/O controller 14 responds to requests of each processor 10 and 12 by actuating one of the read-write control circuits to operate the peripheral devices which the processor request identifies.

I/O CONTROLLER—PROCESSOR COMMUNICATIONS

With further reference to FIG. 1, in a predetermined segment of the main memory 16 there are located sets of registers 15 with each set being associated with one processor and each register being in the form of a number fixed memory locations. These sets of registers provide temporary storage for calls in the form of instructions and like control information, as distinguished from data, being transferred between the I/O controller 14 and either processor 10 or 12.

In the illustrated embodiment, communications between the word processor 10 and the I/O controller 14 involving the above mentioned transfer of instructions proceed indirectly through control of the master program group to the set of registers 15 associated with processor 10. By contrast, communications between the character processor 12 and the I/O controller 14 involving the transfer of instructions proceed directly to the registers 15. One reason for the above, is that word processor operates with a fixed format of one type whereas the character processor operates with a format of a second type.

More particularly, when a processor is to communicate with the controller 14, the processor sends a request to its associated communications storage register 15. This request has the format shown in FIG. 1 (in the memory 16) and includes the following portions:

Reason Code/Group Number Code/PIT/Address I/Address I/Address II

The Reason Code identifies the type of request, e.g. in the case of the I/O controller 14 such code may specify a data transfer, The Reason portion of the request can include a sub-reason code to specify additional information relative to the indicated operation. For instance, during a data transfer, the subreason code may specify that an end-of-record character is to be sensed.

The group code identifies either the word processor 10 and a particular program group number or the character processor 12, as having initiated the operation.

The protection identification tag (PIT) portion of the request is a code assigned to selected porgrams to prevent other programs from accessing certain memory locations for tne purpose of providing protection to stored information and to preclude interference between the various program groups.

Address I identifies the main memory address for locating control information pertinent to the transfer operation to be performed.

Address II is an address field identifying the main memory starting address for the data transfer.

As indicated previously, the illustrated I/O controller operates on a character basis while the word processor 10 operates on a word basis. Further, the I/O controller 14 uses a two address instruction format while the word processor 10 uses a three address instruction format. Because of the incompatibility between these formats, communication between the word processor 10 and the I/O controller 14 proceeds by way of the master program group. More specifically, preliminary to the initiation of a peripheral transfer instruction, the word processor 10 computes the data address and other information required for the transfer which the requesting program calls for. The word processor then starts (i.e. turns on) the master program group and also places an address identifying the storage location of the computer control information in one of the sets of registers 15 associated with the master program group. Processing of the master program group causes the referencing of the storage location specified by one of register 15 and the processing of the information from the requesting program group. Upon completion of this processing, the master program group generates the peripheral transfer instruction having an appropriate format which is loaded into one of the registers of the set storage registers 15 in the main memory 16. This loading proceeds immediately when the particular peripheral device requested by peripheral instruction has no previous instructions directed tnereto, otherwise the new peripheral transfer instruction is stored off temporarily in another area of memory until such time as the addressd peripheral device is free.

The above processing by the master program group involves editing the program instruction generated by the particular program group of the word processor 10 to which the forthcoming transfer relates. The master program goups effects this editing operation by making reference to a set of tables stored in the main memory 16 and maintained by the master program group. Additionally, the master program group directs certain ones of the tables to assign one of a limited number of time oriented read-write control circuits, to interconnect the requested peripheral device with memory during the processing of the peripheral data transfer instruction of a requesting program group. In addition, the processor 10 assigns or reassigns peripheral control unit and devices to each program group by the referencing of other tables stored in memory.

In contrast, the character processor 12 and I/O 14 both operate on a character basis in accordance with similar instruction formats. In this operation, the particular program active within the processor 12 produces the pertinent addresses and issues the peripheral data transfer instruction to the I/O controller 14 directly. The operation proceeds by loading an instruction of the format specified by the transfer request into one of the sets of main memory registers 15 assigned to the processor 12.

DESCRIPTION OF I/O CONTROLLER

Figure 2:
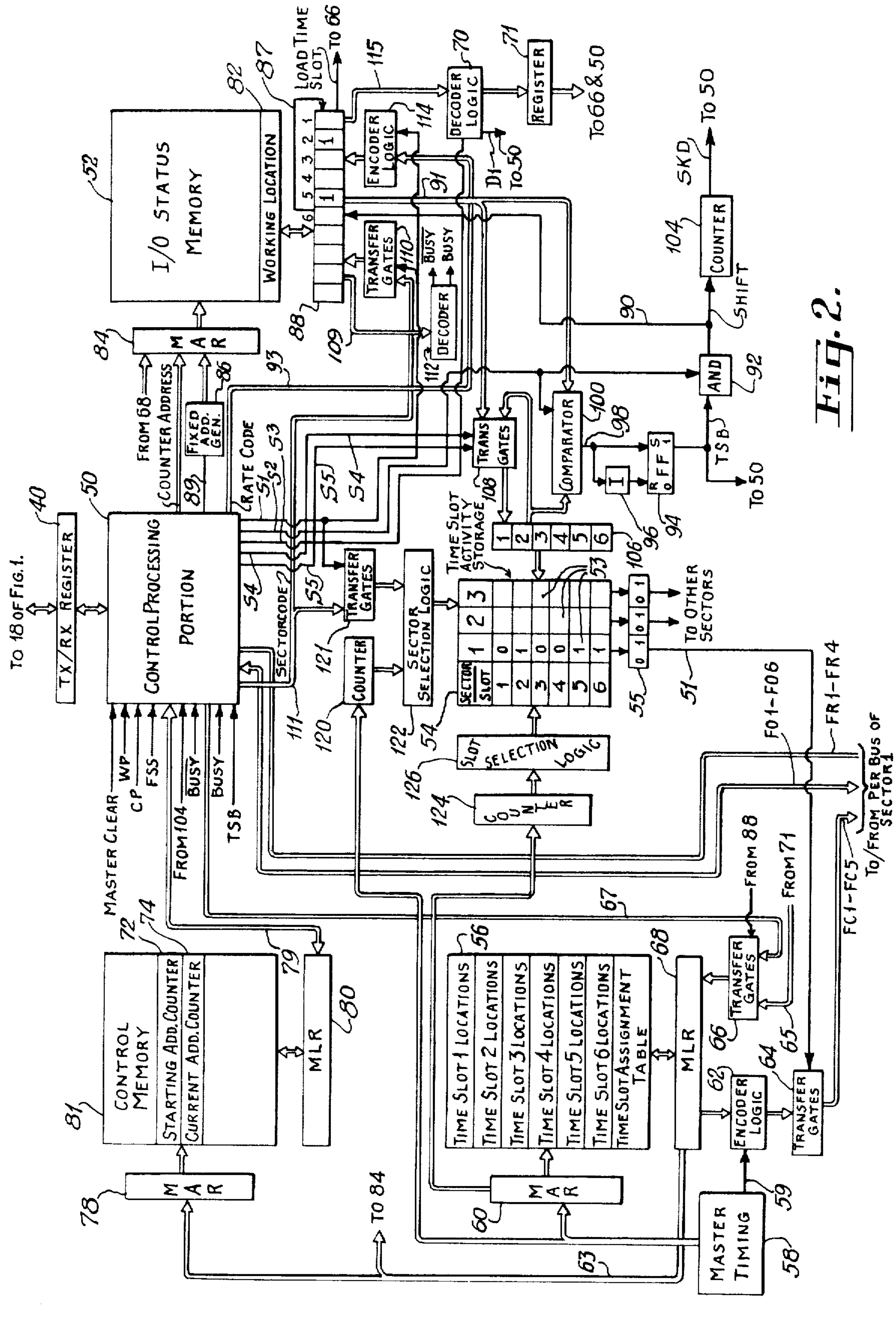
FIG. 2 is a diagrammatic representation of an input/output controller for use in the system of FIG. 1.
Figure 2A:
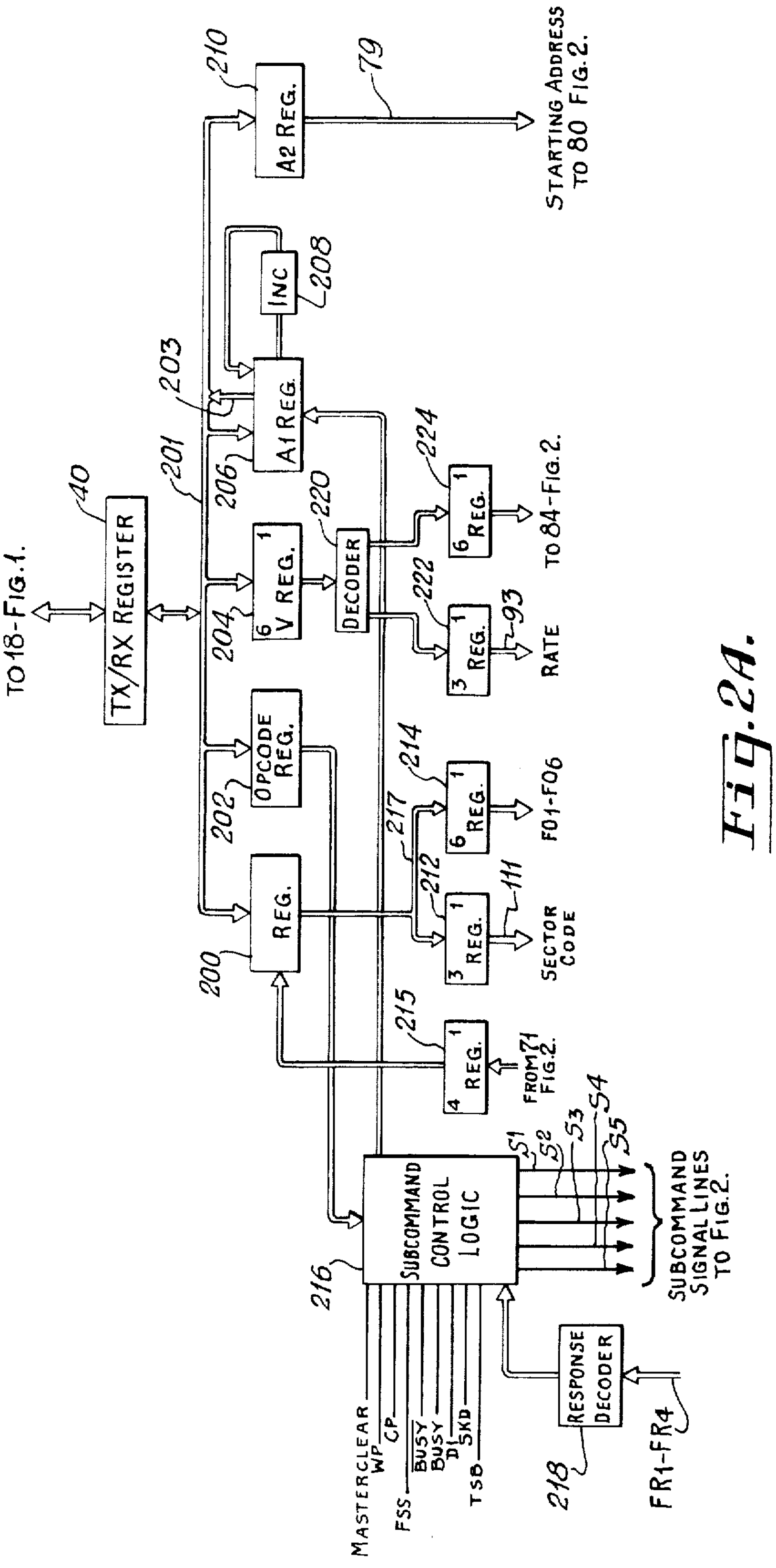
FIG. 2A is a diagrammatic representation of the instruction and control processing portion of the controller of FIG. 2.

Reference should now be made to FIGS. 2 and 2A which disclose in detail the logic for implementing the I/O controller 14 of FIG. 1. As shown in FIG. 2, the I/O controller 14 comprises five major parts: a second memory portion 81, an input/output status memory 52, a timing slot activity storage table 54, a memory providing a time slot assignment table 56, and a control processing portion 50. The memory time slot assignment table 56 and associated circuitry including MAR register 60, MLR register 68, encoder logic 62 and transfer gates 64 and 65 are duplicated twice more for the sectors 2 and 3. A master timing control 58 generates timing pulses for synchronizing the operation of these various portions of the controller 14.

CONTROL MEMORY

The control memory portion 81 includes a plurality of multi-position registers which store address information pertinent to the processing of a particular peripheral instruction. More specifically, allocated to each read/write control circuit is a pair of registers referred to in the illustrated embodiment as a starting address counter 72 and a current address counter 74. The starting address counter 72 or register stores the starting address of the location in main memory from which the particular data transfer is initiated. The current address counter 74 or register stores the main memory 16 location currently being addressed.

A memory address register (MAR) 78 connected to receive an input from a memory local register (MLR) 68, provides access for reading information into the control memory 81. A bus 79 connected to a memory location register (MLR) 80 provides communication between the control memory 81 and the control processing portion 50 of the controller for both entering new information into the memory 81 and for modifying existing information.

TIME SLOT ASSIGNMENT TABLE

The memory forming the time slot assignment table 56 connects to the peripheral bus of its one sector and includes a number of groups of time slot locations (e.g. six) which store control information pertinent to the processing of instructions involving peripheral devices in that sector. This information is periodically referenced by other portions of the input/output controller 14 during both the processing and execution of instructions. The table 56 has twelve storage locations, each having 16-bit positions and two of which constitute time slot locations for a single group. Associated with the table 56 is a separate address register 60 and a memory local register 68. The address register 60 receives as inputs address signals, generated by the master timing control 58, for referencing successive storage locations or time slot locations within the table 56.

The master timing control 58 is connected to receive signals (not shown) from the FIG. 1 master clock that generates timing signals for synchronizing the I/O controller 14 with the remainder of the FIG. 1 system. In response to these timing signals, the master timing control 58 cycles the time slot assignment table 56 at the transfer rate of its peripheral bus connected between the FIG. 1 controller 14 and the peripheral devices 19. Thus, the latter table 56 functions as a memory cycle distributor whose cycling period defines a predetermined number of sub-intervals or time slot intervals which collectively constitute an operative cycle. By way of example, in the illustrated embodiment, the table 56 has an operative cycle equal to twelve microseconds, i.e. recycles at a twelve microsecond rate, and each time slot interval is two microseconds long.

Also in the illustrated embodiment, as indicated above, two storage locations are allocated to each time slot location for storing first and second control words respectively.

During one time slot interval (e.g. a two microsecond period in the twelve-microsecond system just noted), the control words stored in both time slot storage locations are read out sequentially into MLR 68. The digits in predetermined bit positions within the first control word designate a time slot code. Further digits indicate whether the order is an input/output operation. Another digit in a further bit position designates whether the associated read-write counter is to be incremented or decremented. Other bit positions are read to define error conditions detected by the I/O controller 14 during the processing of peripheral instructions. The second control word includes address information (e.g. setting forth or for locating) the particular read-write control circuit associated with the time interval. More specifically, the address designates a first one of one of the locations storing the address of one of the pairs of storage registers in the control memory 81. For example, the address of register 74 of the pair of registers 72 and 74. Other bits of the second control word store a PIT code and a group number code.

During the sequencing through the storage location of each slot location storing the first control word of a time slot interval, an encoder logic unit 62 is connected to receive the control word bits that constitute the time slot code, in addition to receiving a timing signal on line 59 from the master timing control 58. The encoder unit 62 operates, at that time, to generate an inquiry code which is applied as an input to a set of transfer gates 64 (the inquiry code in practice is generally stored in a storage register (not shown) for application to these gates). The transfer gates 64 are connected by line 51 to receive also a signal from the time slot activity storage table 54 which is applied by way of a time slot output register 55.

The MLR register 68 is connected to receive the control information associated with a particular time slot interval from a further set of transfer gates 66. The transfer gates 66 receive signals appearing on a bus 67, in addition to a load time slot signal from the control processing portion 50. A set of coded signals from the output of a decoder 70 is also applied as an input to the transfer gates 66 by way of a bus 65.

I/O STATUS MEMORY

With further reference to FIG. 2, the I/O counter status memory 52 comprises a number of multi-position storage registers for storing information relating to the status of each pair of starting and current address counters 72 and 74, respectively. In the illustrated embodiment, the status memory 52 has a storage register for each pair of counters constituting each read-write control circuit in the system. In addition, the memory 52 has a storage register 82 utilized as a working location. Each storage register within the memory 52, is by way of example, ten bit-positions wide. The first six of the bit positions of each register are allocated to store a digital representation of the transfer rate; the rate is coded in terms of the number of time slot intervals that are required to accommodate the data transfer rate to be associated with the particular counter pair identified with that register. The next three bit positions store a code indicating either the sector to which the counter pair has been assigned or a code indicating that such counter pair is available for assignment. The last bit position stores an interlock bit for maintaining programming compatibly between systems.

The referencing of a particular location in memory 52 is effected by loading an address into an associated memory address register 84. This register 84 receives address signals from the control processing portion 50, the register 68, and a fixed address generator 86. The generator 86 responds to a control signal appearing on line 89 from the control portion 50 to generate an address for referencing the working location 82 of the status memory 52.

A memory local register 88 is also associated with the I/O status memory 52. The first six stages (i.e. 1–6) of the register 88 are interconnected to operate as a end around shift register as indicated diagrammatically by the line 87. The shift register portion of register 88 receives a shift signal by way of a line 90 from the output of an AND gate 92. The input signals to AND gate 92 are the SET output of a time slot busy flip-flop 94 and a signal on a line S1 from the control processing portion 50. The flip-flop 94 is reset, via line 98, by the output signal from a comparator 100, applied through an inverter 96. The same line 98 is additionally applied directly to the set input of the flip-flop 94. The output of the AND gate 92 is connected as an input to a multi-stage counter 104 which generates the signal SKD when it contains a selected count. The SKD signal from the counter 104 is applied as an input to the control processing portion 50.

The comparator 100 is connected to receive, as inputs, the contents of the shift register portion of the memory local register 88 by way of a bus 91, and the contents of a sector readout register 106 associated with time slot activity storage 54. The comparator also receives an input by way of line S2 from the control processing portion 50. The register 106 receives, from the bus 91 and by way of a set of transfer gates 108, the contents of the shift register portion of the memory local register 88. This transfer takes place when the transfer gates 106 receive a control signal S4 from the control processing portion 50.

The MLR register 88 in FIG. 2 receives the signals applied to a set of transfer gates 110 from the control processing portion 50 by way of a bus 111. The gates 110 also receive a signal on the line S1 from the control processing portion 50. A decoder 112 is connected to receive the signals at the output of selected sector code bit positions within the MLR register 88 by way of a bus 109, and develops BUSY and $\overline{\text{BUSY}}$ output signals which are applied to the control processing portion 50.

Additionally, the shift register portion of the MLR register 88 is connected to receive signals from an encoder 114 which is connected to the control processing portion 50 by way of a bus 93. The encoder 114 receives an input signal on the line S1 and encodes the signals appearing at the input thereof into a six-bit code configuration. The encoder 114 has transfer gate means (not shown) which transfer the encoded signals into the MLR register 88.

A second decoder 70 receives signals from the shift register portion of the MLR register 88 by way of a bus 115 in addition to receiving a signal on line S3 from the control processing portion 50. The decoder 70 output signals are applied to a three-bit slot code register 71, which is in turn connected to the transfer gates 66 (left side of FIG. 2) and the control processing portion 50. Upon receipt of a predetermined code on bus 115, the decoder 70 generates a signal which is applied via line $D_1$ to the control processing portion 50.

TIME SLOT ACTIVITY STORAGE

The illustrated time slot activity storage 54 is constructed with a plurality of bistable storage elements 53 arranged in rows and columns to form a six by three matrix which is diagrammatically shown in FIG. 2. Each storage element 53 can be either a flip-flop or a latching type gated buffer amplifier circuit (GBA) with associated set and reset gating structure of conventional design. The gating structure, when activated, sets element 53 to store either a binary "1" or binary "0" respectively in accordance with the activity or non-activity of a particular time slot interval of a sector as communicated from the register 106. The time slot activity storage 54 is shown as including a column of six storage elements 53 for each sector (i.e. sectors 1–3), while each row of the storage 54 includes the corresponding storage elements 53 for a each time slot interval (i.e. time slots 1–6) for one sector. Thus, in the present embodiment, the storage 54 stores status activity information pertaining to eighteen time slot intervals.

Sector selection logic 122 is arranged to address a single column of bistable elements 53 in the storage 54, and slot selection logic 126 is arranged to address a single row of the elements 53. In particular, the sector logic 122 decodes signals applied thereto, and causes the contents of each storage elements 53 in the sector addressed by the addressed signals to be sampled and indications thereof to be stored off in the output register 106. This mode of addressing is used during the operations involving the referencing of the storage locations of the status memory 52. These operations include: (1) checking the availability of time slots within a sector, (2) entering or loading new time slot information (i.e. updating) or (3) clearing time slot information at the termination of a data transfer operation.

The second mode of addressing the storage 54 is effected by the slot selection logic 126 decoding the sets of signals applied thereto to cause the signals from the row of storage elements identified by the signals being decoded to appear at the output of the individual stages of a time slot readout register 55. The presence or absence of signals (i.e. binary "1" or binary "0" respectively) on each line 51 for each sector at the output of the register 55 indicates the "activity" or "non-activity" respectively of the time slot intervals of each of the three sectors.

The cycling of the time slot assignment table 56 and of the time slot activity storage 54 are synchronized so that the control information stored in a particular time slot location is available simultaneous with the addressing of the storage element 53 associated with that time slot location. The master timing control 58 provides this synchronizing by cycling both the time slot assignment table 56 and the time slot activity storage 54 at the same rate. In practice, this can be done by connecting the MAR register 60 to a counter 124 that develops the signals for addressing the slot selection logic 126.

Figure 3:
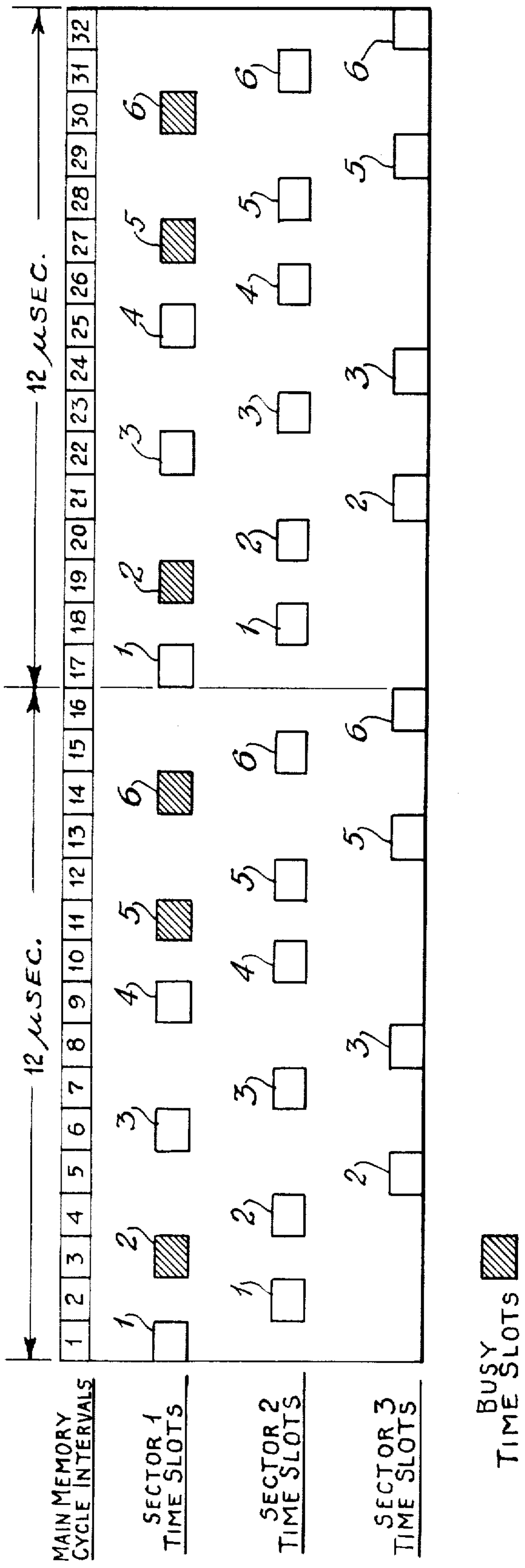
FIG. 3 is a chart of timing relations illustrative of the operation of the input/output controller of FIG. 2.

The sector selection logic 122 receives address signals from a counter 120. In addition, signals on bus 111 are applied to the selection logic by way of transfer gates 121 that receive the line S1 from the control processing portion 50. The counter 120 receives timing signals from the master timing control 58. The contents of the counter 120 are applied to the sector selection logic 122, which decodes the different sets of signals it receives from the counter 120 as derived from the master timing control 58. That is, the master timing control 58 conditions the counter 120 to cycle in a manner which effectively timewise offsets the addressing of sectors 1, 2 and 3 from each other. In the preferred embodiment, the addressing of the three sectors is offset so that the addressing of a sector 1 time-slot location within table 56 lags ¾ of a microsecond behind the addressing of the corresponding time sector 2 slot location in a second table (not shown) identical to table 56 and assigned to sector 2. The relationship between the addressing of time-slots and the addressing of sectors 1–3 is illustrated in FIG. 3 and is discussed below.

CONTROL PROCESSING PORTION

FIG. 2A shows the principal registers and the subcommand control logic in the control processing portion 50 of FIG. 2. A transmit-receive register 40 is connected to interface the registers of the control processing portion 50 with the remainder of the system of FIG. 1. A first group of registers in the control portion 50 includes: a temporary storage register 200, and OP code register 202, a variant register 204, a first address register 206 with associated incrementing logic 208, and a second address register 210. Each register is individually connected to receive information directed thereto from the register 40 on a bus 201. In addition to being connected to the bus 201, the register 206 is connected to transfer information to the register 40 by way of a further bus 203. The register 200 is connected separately to a sector register 212 and to a storage register 214 by way of a bus 217. The register 210 is connected to the FIG. 2 bus 79. The output of the sector register 212 is connected to the bus 111 shown in FIG. 2 connecting the control portion 50 to the transfer gates 110 and 121. The register 214 is further connected to a plurality of data output lines F01–F06.

Transfer gates (not shown) apply the signals on the lines F01–F06 to any one of the sectors 1–3 (FIG. 1) in response to signals from the FIG. 2 timing unit 58. The timing unit 58 operates different transfer gates to channel the information on the lines F01–F06 to different sectors.

With reference to FIGS. 1, 2 and 2A, in the illustrated arrangement, each transfer bus interconnecting the I/O controller (FIG. 1) with the peripheral devices 19 in any one sector 1, 2, 3 includes the data output bus (lines F01–F06 of FIGS. 2 and 2A) which transfers information from memory 16 to the peripheral devices associated with the peripheral control units. Each transfer bus also includes a data input bus (not shown) which transfers information from the peripheral devices through their respective control units to the memory 16. Each sector or transfer bus also includes a plurality of lines for transferring control signals from the I/O controller 14 to the peripheral control unit. These lines include, in addition to an external control lead (FSS, FIGS. 2 and 2A), the inquiry lines (FC1–FC5, FIG. 2), and plural response lines(FR1–FR4, FIGS. 2 and 2A) for returning coded signals to the I/O controller 14 to indicate whether a device which has been allocated a time slot interval desires to communicate with the I/O controller 14 during that interval. For details relative to the manner in which each of these busses can connect to each peripheral control unit/device, reference should be made to the aforementioned patent of Oliari and Fischer which is incorporated herein by reference.

With further reference to FIG. 2A, the OP code register 202 is connected to sub-command control logic 216. This control logic operates in accordance with input signals from a response decoder 218, and with a plurality of control signals both internally and externally applied thereto. The signals include master clear, CP request, WP request, BUSY, $\overline{\text{BUSY}}$ and an output signal on line $D_1$. In reponse to these signals, the control logic 216 generates, on lines S1–S5, sub-command signals used in processing a peripheral instruction.

The variant register 204 is connected to a decoder 220 the output of which is individually connected to a rate register 222 and an address register 224. The register 222 is connected to the FIG. 2 bus 93 and register 224 is connected to the FIG. 2 MAR register 84.

It will be appreciated that all double drawn lines in FIGS. 1, 2 and 2A are multiple conducting lines conveying several bits of information in parallel.

DESCRIPTION OF OPERATION

With reference to FIGS. 1, 2 and 2A, the manner in which the I/O controller 14 processes a peripheral transfer instruction will now be described. Prior to processing the instruction, it is assumed that all data and control registers of the control processing portion 50 have been cleared. This can be done by applying a master clear signal to the subcommand control logic 216 of FIG. 2A and of the FIG. 1 I/O controller 14.

The I/O controller 14 initially is operative in accordance with conventional priority logic to ascertain the next task requiring attention. When the control processing portion 50 receives a CP request signal indicating that the character processor 12 has inserted a request into its associated storage register 15 in main memory 16, the I/O controller 14 references that storage register and extracts the information contained therein. The correct storage register location 15 is referenced by transferring to the memory 16 an address generated by the subcommand control logic 216 in response to a CP request signal it received. In particular, when the memory controller 18 grants the I/O controller 14 access to the memory 16, this address is delivered to the main memory 16 MAR register by way of the registers 206 and 40 of FIG. 2A.

On successive cycles, the addressed request (having the format shown stored in the particular main memory communication storage register (FIG. 1)) is extracted and stored in registers of the control processing portion 50 (FIG. 2). More specifically, the I/O controller 14 stores the reason code portion of the request in the FIG. 2A code register 202, the Address I information in the register 206 and the Address II information in the register 210. The group code and the PIT code are stored in other registers (not shown) of the control processing portion 50.

The contents of the OP code register 202 are then interpreted by the subcommand control logic 216. Upon determining that such code indicates the processing of a data transfer instruction, the control logic 216 initiates the referencing of the pertinent control information associated with the indicated transfer operation. Assume for example that this control information includes the following character control sequence: C1/C*e*/C2–C*n*, where C1 is coded to designate the particular read-write control circuit. C*e* is an escape code which specifies the particular sector to be used, e.g. sector 1, and specifies also data transfer rate (e.g. 167 kc.). The C2 code specifies the peripheral control unit which is to communicate with the main memory 16 by way of the specified read-write control circuit. The second character C*e*, referred to as an escape code, permits the I/O controller 14 to assign any of the number of read/write control circuits to an I/O data transfer operation between memory and a peripheral device in any one of the sectors of the system. More specifically, when an escape code character is present, it is interpreted to define the sector in lieu of the coded C2 character.

Assume further that the addressing of main memory 16 takes place in a four-character addressing mode wherein one to four characters are extracted from the memory 16 during each referencing thereof by the I/O controller 14. During the extraction of control characters from the main memory 16, the contents of the register 206 serve as the source of address signals for the MAR register of the main memory 16.

When all the control characters from the main memory 16 are transferred to the register 40, which can be indicated by the detection of a punctuation character, the I/O controller 14 transfers each character in either a modified or unmodified form to the pertinent registers for subsequent referencing during the processing of the subject data transfer instruction. More specifically, the subcommand control logic 216 generates signals for directing the C1 character to the register 204. The decoder 220 interprets the contents of this register to send a six-bit address code to the register 224. This address code in register 224 serves as the address of a storage location in the status memory 52 which stores status information relative to the active read-write control circuit. It also serves as the address of the storage location in the control memory 81 which stores the main memory address associated with the transfer operation.

The I/O controller 14 interprets the *Ce* character and sends a three bit code to the register 222. This code specifies a transfer rate at which communication between the main memory 16 and the peripheral device is to proceed; the three bits are coded in terms of the number of time slot intervals required to accommodate the particular rate. An illustrative manner in which the three-bit rate code is coded is—

| Rate, in thousand characters per second (kcs.): | Bit configuration of rate register **222** |
|---|---|
| 0 | 000 |
| 83 | 001 |
| 167 | 010 |
| 250 | 011 |
| 333 | 100 |
| 500 | 110 |

The I/O controller 14 also extracts from the *Ce* character a code, which specifies a sector, and then directs the code to the sector register 212. When *Ce* character is not an escape code, the I/O controller 14 interprets the third character, C2, as specifying a particular sector for use in the peripheral operation.

Here, in the assumed example, the second character has been defined as an escape code, and this code, as is indicated previously, is directed to the sector register 212. The third character C2, identifying the peripheral control unit involved in the data transfer operation, is transferred from register 40 by way of register 200 to register 214.

Upon having effected the interpretation, derivation, and storage of the pertinent parameters in the aforementioned registers, the I/O controller 14 ascertains whether the particular request can be accommodated. More specifically, the I/O controller determines whether the particular read-write control circuits, i.e. the specified pair of storage registers in control memory 81, is available for assignment; whether there are sufficient time slot intervals in the specified sector for accommodating the specified data transfer rate; and whether the peripheral control unit specified is available for assignment.

For purpose of the further operation description, the instruction being processed specifies a transfer rate of 167 characters per second, and that the data transfer is to be effected between the main memory 16 and a peripheral device connected to sector 1.

The assignment or allocation of a particular read-write control circuit and of time slot intervals to an available peripheral device in accordance with the subject instruction involves: (1) determining the availability of the specified read-write control circuit; (2) searching time slot activity storage table 54 to ascertain whether sufficient time slot intervals are available within the particular sector to accommodate the specified 167 characters per second transfer rate; and (3) assigning the specified read-write control circuit and time slot intervals to accommodate the data transfer operation at the rate specified. Additionally, the requisite control signals are also generated for advising the peripheral control unit and peripheral device of this assignment.

However, prior to checking the availability of the specified read-write control circuit, the I/O controller 14 determines whether the particular peripheral control unit is available for assignment. The I/O controller 14 makes this determination by applying to the transfer bus lines FO1–FO6 for sector 1, which sector the code in register 212 identifies, the address code in register 214. This address code identifies the particular peripheral control unit and calls for a control signal to initiate a status check of the addressed peripheral control unit. If the peripheral control unit is not busy, an appropriate response signal is returned by way of a signal on the status bus lead, FSS. For details regarding the manner in which the peripheral control unit is connected to receive and interpret this control signal, reference should be made to the aforementioned patent of Oliari and Fischer.

The sub-command control logic 216 of the I/O controller 14, upon interpreting the aforementioned response signal, generates additional control signals for determining whether the particular rear-write control circuit is available for assignment.

AVAILABILITY OF THE READ-WRITE CONTROL CIRCUIT

As indicated previously, in the illustrated embodiment, the status memory 52 (FIG. 2) includes a plurality of multi-bit storage registers, each of which contains control information pertinent to the assignment status of a read-write control circuit. The availability of a particular read-write control circuit is determined by referencing the location in the I/O status memory 52 specified by the contents of register 224, FIG. 2A. More particularly, the contents of register 224 are applied to the MAR register 84 to initiate a memory cycle that reads the contents of the specified register into the MLR register 88. Assuming the availability of the specified read-write control circuit, the three bit positions of the addressed status register which store a sector code will have been set by the I/O controller 14 to store the code (001). Decoder 112 decodes the 001 bit configuration to generate the signal $\overline{\text{BUSY}}$. The I/O controller 14 interprets this signal to indicate that the corresponding read-write counter pair are available for assignment. When the aforementioned three bit positions contain a code configuration other than 001, the decoder 112 generates a BUSY signal, which the I/O controller 14 interprets as indicating the unavailability of the requested counter pair. In such instances, the I/O controller 14 generates, at a later time, a control signal to inform the requesting processor of FIG. 1 of the nonavailability of the requested read-write counters.

In response to the signal $\overline{\text{BUSY}}$, the I/O controller subcommand control logic 216 of FIG. 2A generates control signals for determining whether there are sufficient time slot intervals to accommodate the specified 167 kcs. transfer rate.

SEARCH FOR TIME SLOTS

Since each read-write counter in the illustrated system can be associated with one or more time slot intervals of a particular sector, the rate availability of the sector must be checked. The term "rate availability," for purposes of the present invention, refers to the number of available or unused time slot intervals in a sector which are required to sustain a specified transfer rate. The significance of the term "rate" may be better appreciated after a consideration of FIG. 3.

FIG. 3 is a form of timing chart for a memory cycle distribution for the three sectors 1, 2 and 3 over a time duration illustratively of 24 microseconds (i.e. a chart showing the allocation of memory cycles to each of three sectors over a 24 microsecond interval). The numbers appended to the boxes in the chart designate time slot intervals. The shaded boxes designate assigned time slot intervals, and the unshaded boxes represent unassigned intervals.

The illustrated distribution includes thirty-two memory cycles, each having a ¾ microsecond duration. The memory cycle distribution is repetitive and has a cycling time of 12 microseconds. The maximum number of time slot intervals distributed is determined by the number of memory accesses available in a cycle (i.e. in a 12-microsecond period). It is possible to assign sixteen time slot intervals during the 12-microsecond period because sixteen memory accesses are possible within this time. In the illustrated distribution, sectors 1 and 2 are allocated six time slot intervals while sector 3 is allocated only four. The corresponding time slot intervals, as mentioned previously, are shown offset from each other by ¾ of a microsecond (i.e. a memory cycle).

As illustrated in FIG. 3, each time slot interval in sectors 1, 2 and 3 is offered access to memory (i.e. a main memory cycle) once every 12 microseconds. For example, referring to sector 1, it is seen that the first time slot interval is offered the first memory cycle and then the seventeenth memory cycle. Consequently, by assigning a single time slot interval to be associated with a read-write circuit during the transfer of characters from an activated peripheral device to memory, it is possible to sustain a transfer rate of 83K characters/second instances where a single character is transferred between main memory and a peripheral control unit once every 12 microseconds. Therefore, with the present invention, it is possible to carry on up to sixteen peripheral transfer operations simultaneously by independently associating a different time slot interval of the three sectors with a unique read-write circuit. More important, it is now possible to assign two or more time slot intervals collectively of a sector to any one available read-write control circuit to realize transfer rates higher than otherwise feasible. And, this is accomplished with this invention by utilizing a technique described below which essentially maximizes the utilization of unused time slot intervals by assigning time slot intervals in proportion to the transfer rate specified.

Peripheral instruction processing is considered now with further reference to FIG. 3. As previously, assume the requested rate corresponds to 167K characters/second. FIG. 3 shows that there are three time slot intervals in sector 1 which have not been assigned. These correspond to the unshaded boxes labeled 1, 3 and 4. The manner by which the I/O controller 14 ascertains the availability of these time slot intervals will now be described. Prior to searching for time slot availability, the I/O controller 14 conditions the encoder 114 of FIG. 2 to generate a six-bit code from the three-bit code stored in rate register 222. The six-bit code is generated in accordance with the following table.

| Bit configuration of rate register **222** coded in terms of the number of time slot intervals: | 6-bit code |
|---|---|
| 000 | 000000 |
| 001 | 001000 |
| 010 | 010010 |
| 011 | 010110 |
| 100 | 110110 |
| 110 | 111111 |

Thus, when the contents of the rate register 222 are applied to the encoder 114, upon the application to the encoder of a subcommand signal on the line S1, the encoder output code, which in the present example corresponds to the code 010010 identifying the 167 kc. rate, is gated into the six low-order bit positions of the shift register portion of the MLR register 88. Also at this time, the contents of the sector register 212 (FIG. 2A) appearing on the bus 111 condition the transfer gates 110. As a result, a coded representation of the contents of register 212 are loaded into the three sector bit positions of the status memory MLR register 88. (It will be appreciated that this code configuration is an arbitrary one and that any other of the six code combinations could have been alternatively initially loaded into the shift register portion of the MLR register 88.)

Simultaneous with this loading of MLR 88, the sector register 212 (FIG. 2A) addresses the time slot activity storage 54. Specifically, the contents of register 212 are applied to the set of transfer gates 121 (FIG. 2) via bus 111. When the subcommand control signal S1 conditions these gates, the register 212 contents condition the sector section logic 122 to address a particular sector of the storage 54.

The activity status of all the time slot intervals of the addressed sector are, at this time, sampled and stored off in the sector readout register 106. The I/O controller then compares the contents of the sector read out register 106 bit-by-bit with the six low-order bit positions of the shift register portion of the MLR register 88. The comparator 100 executes this comparison upon being conditioned by a subcommand signal on line S2 generated by the Control Processing portion 50.

The results of the comparison are stored in a busy flip-flop 94, also shown in FIG. 2. That is, a favorable comparison between the contents of any one of the six bit positions of the register 106 and the corresponding "one" bit position (i.e. 2 and 5) of the shift register (rate) portion of the MLR register 88 which correspondence signifies that such time slot is "active," causes the comparator 100 to generate a signal on the line 98. This switches the flip-flop 94 to its binary "one" (or set) state. The flip-flop 94, at this time, produces the signal TSB. Thus, the flip-flop 94 generates the TSB signal if during such comparison any set of bit positions (in the rate portion of the MLR register 88) storing a binary "one" finds a binary "one" in any corresponding bit position in the sector output register. The signal TSB indicates that the particular bit configuration designates time slot intervals which are not available for use at this time (i.e. constitutes a busy code configuration).

Referring again to the present example, since bit positions 1–6 of register 106 contain a 010011 bit configuration representative of the time slot activity of sector 1, and since the shift register portion of register 88 is storing the code 010010, there is a favorable comparison between the contents of one or more bit positions (i.e. between bit positions two and five) which causes the flip-flop 94 to be set to its "one" state.

Flip-flop 94 applies the TSB signal to AND gate 92. This conditions the gate to respond to a subcommand signal on line S2 to produce a shift signal on line 90. This signal, in turn, shifts the contents of MLR shift register portion one bit position to the left and recirculates the contents of the leftmost digit position to the rightmost digit position. Subsequent to such shifting, the low order six bit positions now contain 001001. In addition, the shift signal on line 90 causes the initially reset counter 104 to be incremented by one, i.e. from a count of zero to a count of one.

As indicated previously, the counter 104 is connected to count the number of comparisons that have taken place in comparator 100. The counter 104 includes logic stages that generate a SKD signal when the contents of the counter 104 have been incremented to a count indicating that all possible bit combinations have been tested. In the illustrated embodiment, the maximum number of comparisons normally corresponds to a count of six, and hence the initial pattern or bit configuration in bit positions 1–6 of register 88 will be restored after six shifts. However, the maximum number of bit comparisons exceeds a count of six in instances where other initial bit patterns have been loaded into the register 88 for testing the availability of time slot intervals in a particular sector.

Continuing on with the search operation, the I/O controller 14, conditioned by the presence of the signal BUSY at its input, addresses the working storage location 82 during a subsequent memory cycle. This is done by generating a control signal on line 89 to cause the fixed address generator 86 to send the MAR register 84 address signals for referencing the working location. However, readout from this location is inhibited during the first subsequent referencing thereof. Instead, the present contents of the MLR register 88, including the three-bit sector code, the six-bit rate code shifted by one, and the interlock information, are written into the working location 82 during the write portion of the memory cycle in which this first referencing occurs.

During a subsequent memory cycle, the status memory working location 82 is again referenced and the contents thereof are read out into the MLR register 88. A second comparison is effected between the shift register rate portion of the MLR register 88 and the contents of the sector read out register 106 upon the generation of a signal on the line S2. The results of this comparison are again stored in flip-flop 94. In the present example, during this comparison, the contents of the six low order bit positions (1–6) in register 88 contain the rate pattern 100100 while the six bit positions (1–6) of register 106 contain the code 010011. Consequently, there is no match between a bit position of register 106 storing a binary "one" (i.e. bit positions 2, 5 and 6) and the corresponding bit position of the register 88, for position 2, 5 and 6 therein are storing binary "zeros" at this time. Since the comparison hence detects no match, the comparator 100 does not apply a signal to line 98. Consequently, inverter 98 develops a signal that resets flip-flop 94. The resultant flip-flop output signal, at the set terminal, is termed a $\overline{TSB}$ signal and AND gate 92, when conditioned by a signal on line S2 does not develop a shift signal on line 90 because flip-flop 94 is not set to develop the TSB signal. Therefore, the rate configuration stored in bit positions 1–6 of register 88 remains undisturbed and is written, along with the other information in register 88, into the status memory working location 82. The working location 82 is now seen to contain an acceptable (i.e. "not busy") rate code in addition to the sector code associated with the peripheral instruction.

In response to the presence of a $\overline{TSB}$ signal, which indicates the availability of time slot intervals to accommodate the rate requested, the I/O controller 14 generates a sequence of subcommand signals to load the memory of the time slot assignment table 56 with control information for assigning the read-write control circuit and time slot intervals for processing the peripheral instruction.

Before, considering the manner in which this control information is loaded, attention is directed to the bit pattern of the rate configuration. The rate bit pattern has a symmetry that is a function of the buffer storage capacity in the peripheral control unit. More specifically, to minimize the need buffer capacity, the 6 bit rate code pattern generated by the I/O controller 14 as set forth above which establishes the rate at which data characters are to be transferred to and from a peripheral control unit, must define a rate at any instant of time consistent with the rate specified by the transfer instruction being executed. That is, the maximum possible instantaneous rate of transferring characters must not exceed the capabilities of the peripheral control unit during the operative cycle (i.e. 12 microsecond period).

The above becomes clear by considering the following example. In the subject embodiment, a sector or bus operates at a 2 microsecond rate. That is, during the cycling of the memory time slot assignment table 56, it is possible to have a new slot code read out every two microseconds. This code generates a set of inquiry signals to the peripheral control unit assigned this time slot interval permitting it to either accept or transfer a data character during the two microsecond time slot interval.

Thus, the assignment of two adjacent time slot intervals (e.g. in accordance with a code pattern 011000), causes the generation of sets of inquiry signals to the active peripheral device which causes two characters to be transferred within a 4 microsecond interval (i.e. within a first 12 microsecond period) and, after a 10 miscrosecond interval, two more characters to be transferred within another 4 microsecond interval (i.e. during the next 12 microsecond period). The first two-character transfer is at a rate exceeding the specified 167K characters per second rate, while the second two-character transfer rate is considerably less; therefore, it would not be possible to sustain the specified 167K characters per second rate unless additional storage were to be provided in the control unit. However, the selection of a symmetrical pattern (i.e. 010010) satisfies this requirement since this code causes the sets of inquiry signals to be generated once very 6 microseconds to the active peripheral control unit and consequently the transfer of data characters between the control unit and memory occurs once every 6 microseconds, or every third time slot interval.

It will be appreciated that, similarly when transfer instructions call for higher transfer rates, the bit pattern chosen may be such that the maximum rate capability of the hardware is not exceeded. Further, the addition of a small amount of increased storage to the peripheral control unit enables the transfer of data characters to and from the peripheral control unit to either exceed or b less than the rate specified at any instant of time, thereby permitting any asymmetrical pattern to be selected. This is provided, of course, that a sufficient number of time slot intervals is allocated to accommodate the rate specified over a complete operating cycle (e.g. two time slots for the 167K characters per second rate over a twelve microsecond period.)

ASSIGNMENT OF INSTRUCTION PARAMETERS (CONTROL INFORMATION)

This operation may be broken down into three phases:

(1) The loading of information into the storage location of status memory 52;
(2) The loading of the first and second control word information into the time slot assignment table 56 and of the address information into the control memory 81; and
(3) The updating of the sector to reflect the particular time slot assignment.

In the first phase, the I/O controller 14, during one memory cycle, generates a subcommand signal on line 89 which references the working storage location 82, the contents of which are read into the MLR register 88. During a subsequent memory cycle, the counter address contents of register 224 (FIG. 2A) are applied by the control processing portion 50 to the MLR register 84. This conditions the register 84 to reference the status storage location assigned to the read-write counter specified by the stored counter address. Again, readout of the contents of the storage location is inhibited and the working location contents, now stored in the MLR register 88, are written into the status storage location. Now the storage location associated with the particular read-write control circuit contains the rate code pattern, sector code and interlock information. The working location 82 is then referenced and, upon receipt of a signal on line S3 from the control processing portion 50, the decoder 70 decodes the contents of the six bit positions corresponding to the shaft register portion of the MLR register 88 containing the rate code into a three-bit code. The generated three-bit code is stored in register 71. This code corresponds to the slot code portion of the first control word associated with the two slot storage locations of the time slot assignment table 56 to be assigned to accommodate the subject transfer rate. This completes the first phase of the operation.

During the second phase of the load operation, all designated time slot storage locations of the table 56 are loaded at the appropriate time with identical parameters or control information. This is done in the following manner. Since the time slot assignment table 56 must cycle continuously for executing data transfers between peripheral devices and memory in accordance with previous processor requests, the first and second control words are loaded into the storage locations of an assigned time slot interval when the control processing portion 50 generates a load time slot signal. This occurs when both the designated section (i.e. sector 1) is being addressed and a designated time slot location of table 56 for sector 1 is being referenced. Specifically, a comparison between the sector address contacts of counter 120 and the sector code contained in the MLR register 88 read out from the working location 82 can be used to determine when the appropriate sector is being addressed. Upon detecting a match in the comparison, the control processing portion 50 generates a control signal indicating the comparison. This signal conditions logic means (not shown) to compare the positions of the rate shift register portion of the MLR register 88 with the contents of the counter 124. Each time a binary "one" is detected in the referenced bit position of the shift register portion, the aforementioned logic generates the load time slot signal at the output of the register 88.

The load time slot signal conditions the transfer gates 66 to gate the control information appearing on busses 65 and 67 into the MLR register 68. Subsequent timing pulses from the master timing unit 58 cause the information to be written into each of the groups of time slot locations corresponding to the intervals being assigned. Accordingly, the information associated with the first control word, which includes the slot code stored in the register 71, is written into the first storage location. The parameter information, including the address contents of the register 224 (FIG. 2A) and constituting one portion of the second control word, is written into the second time slot storage location.

At the same time that the second control word is being written into table 56, the five-bit counter address code identifying the address of a pair of storage locations forming the assigned read-write control circuit, is also applied to the MAR register 78 of the control memory 81. This references the first of the two storage locations, i.e. the counter 74 which is to store the present address information. The control processing portion 50, at this time, gates the starting address contents of register 210 and appearing on the bus 79, into the MLR register 80 for storage in the referenced location. During the next cycle, the same address information is written into the second of the two paired storage locations, i.e. into current address counter 74. The low order bit positions of the address stored in the MAR register 78 can be modified by adding a count of one thereto to address location 74.

The information in the starting location counter 72 remains stored therein, serving as a point of reference, throughout the execution of the data transfer instruction. The information in the current address counter 74, on the other hand, is incremented to identify the memory 16 location currently being referenced throughout execution of the instruction.

As mentioned previously, one bit in the second control word is coded to specifiy the direction of data transfer (i.e. input or output) of each assigned time slot location in table 56. Incrementing/decrementing logic (not shown) increments or decrements the current location counter 74, according to the value of this digit during execution of peripheral data transfer instruction.

Also during the load operation, the load time slot signal conditions reset gates associated with the rate portion of the MLR register 88 so that, after the foregoing operation, it resets the bit position of rate portion of the MLR register 88 which initially caused the generation of the load time signal. When thus reset, the rate portion of register 88 signals the completion of the loading of parameters relative to its corresponding time slot location.

The process of comparing the sector address in counter 120 with the time slot address in counter 124 proceeds until all the binary "one" rate bits in the shift register portion of the MLR register 88 have been reset to "zero." In the present example, only positions one and four of the rate register portion of the MLR register 88 contain a binary "one." Hence, when both these bits are reset to zeros, the corresponding time slot locations one and four will have been loaded with identical control parameter information. The resultant presence of all "zeros" from the rate register portion of the MLR register 88 at the imput of decoder 70 causes the decoder to signal the completion of the loading operation. In particular, the decoder 70 sends the control processing portion 50, via line D1, a control signal that terminates the second phase of the assignment operation.

During the third phase of processing the peripheral transfer instruction, the I/O controller 14 updates the heretofore nonactive (unassigned) storage locations 53 of the sector 1 of the time slot activity storage 54 to assign the unused time slot intervals in accordance with the acceptable (i.e. not busy) rate code derived previously. The control processing portion 50 initiates this step by responding to the signal on line D1 to reference the counter status storage register of the status memory 52. The status register is referenced by loading the MAR register 84 with the counter address stored in register 224 (FIG. 2A), and the contents of the addressed storage location, loaded during the first phase of the assignment operation, are read into the MLR register 88.

When the storage locations of the time slot activity storage 54 of sector one are addressed as determined by a comparison between the contents of the sector address counter 120 and the sector code bit positions of the register 88, the control processing portion 50 produces a signal on the line S4. This signal conditions the transfer gates 108 to load register 106 with two units of information. One is the binary "ones" and "zeros" previously read out from table 54 and which are coded to identify the activity status of previously-assigned time slot intervals. The other is the binary "ones" and "zeros" (i.e. rate code configuration) read out from the status register of the status memory 52 and which are coded to designate newly-assigned time slot intervals. Hence, register 106 receives the inclusive-OR combination of these units of information. This new contents of register 106, is, in turn, loaded into the sector 1 column of the storage locations 53.

Upon completing the preceeding operation, the control processing portion 50 transfers the contents of register 71 to register 214. The transfer is arranged to convert the three-bit time slot code in register 71 to a four-bit code stored in register 214. During a subsequent processing cycle, the control processing portion 50 transfers this four-bit code to the peripheral control unit designated by the original request (i.e. C3 character) over the bus F01–F06 of sector 1. This code identifies to a peripheral device by way of its peripheral control unit, the time slot code to be associated with that control unit during the execution of the particular data transfer instruction.

Preliminary to the transfer of the time slot code, the I/O controller 14 initiates a status check of the peripheral control unit. Upon ascertaining the unit is not busy, the control processing portion 50 transfers the time slot code to the slot code addressing unit.

The time slot assignment code is effective to set a group of flip-flops in the selected peripheral control unit. Note that this code matches the four-bit code which the encoder 62 generates when the three-bit slot code of the first control word of an assigned time slot location is referenced and read out into the MLR register 68. Thus, only the peripheral control unit storing the assigned code responds to the particular encoding of the signals appearing on the inquiry lines FC1–FC5. The contents of the time slot locations in the time slot assignment table 56 determine the number of times the encoder 62 transfers the assigned code within an operative cycle of the time slot assignment table 56. These contents store the same code in the low order three bits of the first control word. Further, the number of times the lines FC1–FC5 assume the same code configuration within an operating cycle is also a function of the number of time slot locations whose corresponding storage elements 53 are set to the binary "one" state.

Giving specific consideration to the assumed example, since the first and four storage elements 53 of sector 1 in table 54 now store binary "ones," an output signal appears on the line 51 from the slot output register 55 during the readout of the binary "one" contents of both storage elements 53 of the activity storage table 54. This signal conditions the set of transfer gates 64 to transfer the same encoded signals appearing at the output of the encoder 62 onto the lines FC1–FC5 during both time slot intervals. Thus, the same encoded signals appear on the lines FC1–FC5 during both the time slot intervals one and four (i.e. once every six microseconds) and permit the transfer of characters between memory and the active peripheral unit at the specified 167K character per second transfer rate.

It will be appreciated that although the time slot intervals are present during an operative cycle of table 56, information is transferred between the peripheral device associated with the addressed peripheral control unit and memory 16 only during the assigned time slot interval, and then only if the response signals generated during the first portion of the time slot interval indicate that the peripheral device is ready to transfer a character. More specifically, during the execution of the subject data transfer operation, a character of information is transferred between memory and the peripheral device during the time slot intervals only if the assigned peripheral device responded favorably to the time slot code on the lines FC1–FC5 during the first portion of the time slot intervals. If the response signals returned on lines FR1–FR4, as interpreted by the response decoder 218 of FIG. 2A, indicate that the peripheral device is ready to transfer an information character, the peripheral control unit generates signals that enable the information on the data output or input lines to be transferred accordingly. For implementation details relating to these steps, reference should be made to the aforementioned patent to Oliari and Fischer.

Upon completing the data transfer operation, the peripheral device sends the I/O controller 14 and end-of-order response signal on lines FR1–FR4 of sector 1. This signal indicates to the associated peripheral control unit and the I/O controller 14 that the execution of the data transfer instruction has been completed. For details regarding the implementation of the above response generation process, reference should again be made to the aforementioned patent Fischer and Oliari.

The response decoder 218 (FIG. 2A) decodes the end-of-order response to actuate the control logic 216. The control logic then generates the requisite sequence of control signals to release the control circuits and time slot intervals assigned to the data transfer operation. More specifically, the control logic 216 generates a control signal that conditions the MAR register 84 to receive from the MLR register 68 the counter address portion of the second control word of a time slot location associated with the time slot interval. This address references the specified status storage register of the read-write counter pair in the I/O status memory 52.

The contents of this status storage location are read out into the MLR register 88. The transfer gates 108 respond to a signal on the line S5 from the control portion 50 to gate into register 106 the complement of the binary one rate code digits stored in shift register portion of the MLR register 88. The register 106 was previously loaded with the status of the time slot intervals of the active sector. During this gating operation each bit position of the register 88 shift register portion containing a binary one inhibits the corresponding bit position of register 106 from beng set to a binary one.

More specifically, bit positions 1–6 of register 106 previously containing the code 110111 are combined with the 100100 contents of bit positions 1–6 of the shift register portion of the MLR register 88. As a result, register 106 ends up storing 010011. Next the table 54 storage locations 53 for sector 1 are addressed and loaded with this code. The elements 53 of the time slot intervals previously assigned to execute the peripheral transfer instruction now store a binary "zone," while the elements 53 which were not associated with the peripheral operation are reset to their previous state. The contents of the MLR register 88 are reset and the sector bit positions of the read-write counter status location are conditioned to store a code configuration indicating the "not busy" status of the pair of read-write circuits now available for further assignment. The modified contents of the MLR register 88 are written into the status location allocated to the read-write circuits during the write portion of the same memory cycle.

The foregoing arrangement eliminates the need to allocate processing time for modifying the contents of the time slot locations in the time slot table 56. This is because the binary "zero" contents of elements 53 of the associated time slot intervals automatically preclude a gating signal from developing on line 51 during the assigned time slot intervals. This inhibits the transfer gates 64 from generating the predetermined code on lines FC1–FC5. Instead, the encoder 62 generates an unassigned code on lines FC1–FC5 to which none of the peripheral devices of sector 1 responds.

In summary, the invention provides a technique and apparatus for assigning, through any one of a number of read-write circuits or channels, one or more memory cycles or time slot intervals collectively or independently in accordance with the transfer rate of a peripheral device desiring communication with memory. Further, the invention essentially maximizes the allocation of unused or available time slot intervals by allocating time slot intervals in direct proportion to the device rate. Also, a system embodying the invention can accommodate an increased number of simultaneous peripheral operations. This is because the unused memory cycles or time slot intervals can be independently associated with any available read-write circuit or channel, in contrast to being associated with particular read-write circuit or channel. Also with this invention, a limited number of read-write channels can interconnect a memory with all the peripheral devices in the system. In addition, the invention is not limited to a particular memory speed memory-width or peripheral bus rate.

In practice, the invention can be used with changes from the illustrated embodiment. As an elementary example, each read-write circuit or channel can be a single register, in contrast to a pair of registers. Further, the number of time slot intervals can be increased to enable the allocation of time slot intervals more directly in proportion to peripheral transfer rates.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift registers, etc. from his own background knowledge or available standard references, such as Arithmetic Operations in Digital Computers by R. K. Richards (Van Nostrand Publishing Company, Copyright 1955) Computer Design Fundementals by Chu (McGraw-Hill Book Company, Inc., Copyright 1962); and Pulse and Digital Circuits by Millman and Taub (McGraw-Hill Book Company Inc., Copyright 1956).

Further, the Pat. 3,201,762 discloses circuitry which may be employed to implement certain blocks of the present invention. Detail descriptions relating to the transfer bus an peripheral control units and devices are set forth in the aforementioned Oliari Pat. 3,232,110.

For the purposes of the present invention the term "time slot interval" or "time slot" denotes a period of time during which a data transfer between the I/O controller and a peripheral device may be effected. In accommodating a data transfer operation, the invention allocates or reserves one or more of these time slot intervals to a peripheral device in proportion to the maximum rate of the peripheral device.

While, in accordance with the provisions of the statutes, there has been illustrated and described the best form of the invention known, certain changes can be made in the circuitry described without departing from the spirit of the invention as set forth in the appended claims and in some cases, certain features of the invention can be used to advantage without a corresponding use of other features.

Having described the invention, what is claimed as new and novel and secured by Letters Patent is:

1. An electronic data processing apparatus comprising a plurality of processors each capable of independently performing certain arithmetic and logical operations; a plurality of peripheral devices; a main memory for serving said plurality of peripheral devices and being coupled to each one of said plurality of processors for granting access thereto; plural transfer paths each of which interconnects associated one of said plurality of peripheral devices with said main memory on a time sharing basis in accordance with requests therefore generated by various ones of said plurality of processors; means connecting one of said plurality of processors to the remaining ones of said plurality of processors for processing requests for said plurality of peripheral devices, said one of said plurality of processors including a control memory for storing at least one set of digital representations defining a main memory area into which or from which information is to be transferred between a requested peripheral device and said main memory during a data transfer operation as well as the identity of the processor from whence a request originated, and storage means coupled to said control memory for dividing the time available to any one of said transfer paths into a plurality of time slot intervals and for allocating said time slot intervals collectively or independently by different code combinations to associated peripheral devices in accordance with the optimum operating rate of said requested peripheral device wherein information is transferred between said main memory area designated by said control memory and said requested peripheral device during the data transfer operation on a time sharing basis.

2. An electronic data processing apparatus comprising a plurality of processors each capable of independently performing certain arithmetic and logical operations, a plurality of peripheral devices, a main memory serving said plurality of peripheral devices and being coupled to each of said plurality of processors for granting access thereto on a priority basis, plural transfer paths each of which interconnects associated ones of said plurality of peripheral devices with said main memory on a time sharing basis in accordance with requests therefore generated in various ones of said plurality of processors, means connecting one of said plurality of processors to the remaining ones of said plurality of processors for processing requests for said plurality of peripheral devices, said one of said plurality of processors including a plurality of control circuit registers for storing digital representations defining the memory areas of said memory into which or from which information is to be transferred during a data transfer operation as well as the identity of the processor from whence a request originated, and storage means coupled to said control memory circuit registers for independently associating any one of said control circuit registers with one of the said peripheral devices in accordance with a request from one of said other processors.

3. A processor for processing data transfer requests from a plurality of processors between a plurality of groups of peripheral devices connected to a different one of a number of transfer paths and a memory coupled to be shared by said plurality of processors, said processor including means for storing a digital representation defining a memory area into which or from which information is to be transferred from a requested peripheral device during a data transfer operation as well as the identity of the processor from whence a request originated, and said processor further including storage means coupled to said last-named means for dividing the time available to any one of said transfer paths into a plurality of time slot intervals and for allocating said time slot intervals collectively or independently to associated peripheral devices by different code combinations in accordance with the optimum operating rate of the requested peripheral device.

4. Data processing apparatus for effecting the assignment of one or more time slot intervals either independently or collectively of an operative cycle which constitutes a predetermined number of time slot intervals, for transferring data between a plurality of peripheral devices connected to a common sector bus and a memory at a rate specified by requests, each request being coded to include a number of coded information portions including a rate code, directed thereto, said data processing apparatus comprising:

activity time slot storage means connected to store coded indications as to the availability for assignment of each of said time slot intervals for at least said sector bus;

control processing means connected to generate control signals pertinent to the processing of said requests, said control processing means further including storage means connected to store predetermined ones of said portions of said request including said rate code;

said control processing means further including means coupled to said storage means and connected to be responsive to said rate code to generate a code pattern having a number of bits equaling the total number of time slot intervals assignable to said sector bus wherein the number of bits set to a predetermined state correspond to the number of time slot intervals required to accommodate the rate specified by said rate code;

register storage means coupled to said last means and being conditioned by said control processing means to store said code pattern;

comparator means connected to said register storage means and to said activity time slot storage means, said comparator means connected to be responsive to signals generated by said control processing portion to compare the set of coded indications read out from said activity time slot storage means indicating the status activity of each of said time slot intervals with said generated code pattern;

and means responsive to said comparator in the presence of a positive comparison between any one of the bit positions of said generated code pattern in said predetermined state and the corresponding bit positions of said code indications to generate a control signal indicating the non-availability of said number of time slot intervals required to accommodate said rate, said register storage means being responsive to each generation of said control signal to modify said code pattern by a shifting thereof whereby subsequent comparisons are effected between shifted code patterns and the contents of said activity time slot storage means.

5. In a data processing system comprising: a plurality of processors, a memory comprising a plurality of addressable storage locations wherein groups of said addressable storage locations of said memory are reserved to each of said processors to facilitate communications therebetween;

a plurality of sector buses and a plurality of peripheral devices wherein a predetermined number of said peripheral devices are connected in common to a different sector bus;

said plurality of processors including at least one input/output processor connected to all of said sector buses and connected to be operative in accordance with a coded request from one of said processors to effect the transfer of data between said memory means and a predetermined one of said plurality of peripheral devices connected to a one of said sector buses, said data transfer to proceed in accordance with coded information of said request stored in storage locations reserved to said requesting processor, said coded information including an address identifying a first storage location within said memory means from whence the transfer is to be initiated or to be directed to, an address specifying one of a plurality of read-write control circuits and a transfer rate code said input/output processor comprising:

a control memory comprising a plurality of addressable storage locations constituting different ones of said read-write control circuits;

a status memory comprising a plurality of addressable storage locations, each of said storage locations containing a predetermined number of bit positions wherein a prescribed number of said bit positions stores a sector code indicating the assignment status of a corresponding one of said read-write control circuits, said status memory further including an address register for identifying a location therein to be referenced, and an output register for temporarily storing the contents of a referenced storage location; and, a control processing portion connected to be operative in accordance with said read-write circuit address, to condition said address register to address a status storage location specified and read out its contents to said output register, and means connected to be responsive to a predetermined code stored in said sector code bit positions of said output register to generate a control signal indicating the assignment of said read-write control circuit, said processing control portion connected to be responsive, said control signal to generate a signal to said requesting processor indicating that said read-write control circuit is unavailable for assignment.

6. A data processing apparatus for transferring information between a memory and a plurality of peripheral devices in accordance with coded requests from at least one processor, said request including coded information identifying one of which associated ones of said devices together with one of a number of individual sector transfer paths connecting groups of said devices to said memory, an address of one of a plurality of read-write control circuits, address information identifying storage locations within said memory from whence a data transfer operation is to be initiated or be directed to during the execution of a data transfer operation and a transfer rate code, said data processing apparatus comprising:

a control memory comprising a plurality of addressable register storage locations, at least one of said register storage locations constituting a different one of said read-write control circuits;

a time slot memory comprising a plurality of addressable storage locations said time slot memory means connected at least one of said transfer paths and to have its locations addressed at a predetermined rate wherein an addressing all of said locations establishes an operative cycle having a predetermined number of time slot intervals, said locations being connected to store coded control information, said control information including an address of one of the read-write control circuits to be utilized during its associated time slot interval;

a status memory comprising a plurality of addressable storage locations wherein each storage location has bit positions which store information including a sector code and a rate code, said status memory further including addressing means for identifying a location to be referenced and an output register for temporarily storing the contents of a referenced location;

an addressable activity time slot storage coupled to said time slot memory and said status memory, said activity storage adapted to be cycled in synchronism with said time slot memory and comprising a plurality of bistable storage elements arranged in rows and columns to form a matrix, each of said columns of said storage elements connected to store digital code indications as to the availability for assignment of all of said time slot intervals of one of said transfer paths, each of said rows of said storage elements connected to store digital code indications as to the availability for a predetermined number of said time slot intervals for each of said transfer paths, said time slot average including an input/output register for receiving and transmitting information to/from said time slot storage means;

control processing portion being operative in accordance with said read-write control address to condition said addressing means for read out of the status contents of the location specified into said output register, said control portion further including means responsive upon the read out of a predetermined code stored within said sector code positions indicating the availability of said read-write control circuit to set said output register to store an initial digital code pattern generated in accordance with the said rate code wherein the number of bits of a predetermined state of said digital code pattern correspond to the number of time slot intervals required to accommodate said specified rate;

said time slot activity storage including means responsive to signals from said control portion to reference a column of storage locations in said time slot storage means specified by said sector code for read out into said input/output register;

comparison means for comparing the referenced contents of said time slot activity storage input/output register with the contents of said output register on a bit-by-bit basis for determining whether sufficient time slot intervals are available to accommodate said rate;

means responsive to a non-comparison between the contents of each set of the bit positions indicating the presence of a "non-busy" bit pattern to generate a control signal;

and said control portion being responsive to said control signal to generate control signals to effect the assignment of unused time slot intervals, said time slot memory means being conditioned by said control signals to load the same control information including said read-write control circuit address into the groups of the storage locations of said time slot memory means corresponding to said unused time slot intervals and said time slot activity storage being conditioned by control signals subsequent to the loading of said storage locations, to condition said input/output register to update certain ones of said storage elements of said activity time slot storage means to reflect the assignment of unused time slot intervals whereby during the execution of the data memory and said one peripheral device at said transfer operation, data is transferred between said specified rate by the referencing of said assigned read-write control circuit during the assigned time slot intervals.

7. The apparatus of claim 6 wherein said output register comprises a predetermined number of bit positions, means connecting a number of bit positions to form an end-around shift register and means included in said shift register connected to be responsive to an identical comparison from comparator means to shift said code pattern in a predetermined direction by one whereby a subsequent comparison is effected between the new contents of said shift register and the contents of said time slot activity storage.

8. The apparatus of claim 7 further including counter means connected to said comparison means, said counter means connected to be responsive to each identical comparison made by said comparison means to modify its contents by a count of one, and said counter means further including decoding means connected to generate a control signal in response to a predetermined count, said control processing means being connected to be responsive to said control signal to terminate said comparison operation.

9. Apparatus of claim 6 wherein said data processing apparatus includes decoding means, said decoding means connected to be responsive to said non-busy bit code pattern stored in said output register means to generate a predetermined slot code for identifying to the peripheral device those time slot intervals reserved thereto for accommodating said data transfer operation and means connected to said decoding means and to said slot time slot memory means for loading said code as a portion of said control information into the groups of storage locations corresponding to said unused time slot intervals.

10. Apparatus of claim 9 further includes means for transferring said predetermined slot code to said peripheral device for storage thereof upon the completion of said loading operation.

11. The apparatus of claim 6 wherein said control processing portion includes response decoding means connected to said one of said transfer paths, said response decoding means connected to be responsive to an end-of-order control signal from said peripheral device specifying the completion of said data transfer operation to condition said activity storage means to address said column of storage elements of said activity storage means and to condition said status memory address means to address the corresponding status location for read out to said output register and means for applying the addressed contents of said activity storage means and said output register to said input/output register so as to update the contents of said input/output register of said column to reflect the release of time slot intervals assigned to said transfer operation signalled as having been completed.

12. The apparatus of claim 11 wherein said control processing portion includes means responsive to said end-of-order signal for modifying the sector code bit positions of said addressed status location to store a code to indicate the availability for assignment of its associated read-write circuit.

13. A data processing apparatus for selectively transferring information during successive operating time intervals between a common memory and a plurality of peripheral devices wherein associated ones of said plurality of peripheral devices are interconnected by individual transfer paths to said memory on a time sharing basis to accommodate data transfer operations at the rates of the peripheral devices, said data processing apparatus comprising:

control memory means comprising a plurality of addressable registers each for storing digital signals for identifying memory storage locations within an area of said common memory to be referenced during a data transfer operation between said common memory and one of said peripheral devices;

a cyclic memory connected to be cycled at a predetermined rate for establishing a predetermined number of time slot intervals constituting an operative cycle, said cyclic memory being connected to one of said data transfer paths, said cyclic memory comprising a plurality of addressable storage locations, each for storing control information for identifying a peripheral device to which the corresponding time interval is assigned and an address of one of said plurality of storage registers to be associated therewith during said data transfer operation with the number of said storage locations being arranged to identify the same said one register and said device during a corresponding number of time intervals in proportion to the rate of said device, and an output register connected to said cyclic memory for receiving the contents of said locations during said operative cycle, said control memory being coupled to said output register and being conditioned by said output register address contents during said data transfer operation to transfer the contents of said one storage register to said common memory at the transfer rate of the peripheral device as specified by contents referenced during the time slot intervals assigned to said device whereby said transfer proceeds at the optimum data transfer rate of said device.

References Cited

UNITED STATES PATENTS

| | | | |
|---|---|---|---|
| 3,245,045 | 4/1966 | Randlev ---------- | 340—172.5 |
| 3,390,379 | 6/1968 | Carlson et al. ------ | 340—172.5 |
| 3,445,820 | 5/1969 | Wissick ---------- | 340—172.5 |
| 3,374,465 | 3/1968 | Richmond et al. | |
| 3,462,741 | 8/1969 | Bush et al. | |
| 3,469,239 | 9/1969 | Richmond et al. | |
| 3,505,651 | 4/1970 | Barlow et al. | |

PAUL J. HENON, Primary Examiner

H. E. SPRINGBORN, Assistant Examiner

UNITED STATES PATENT OFFICE
CERTIFICATE OF CORRECTION

Patent No. 3,560,937 Dated February 2, 1971

Inventor(s) Robert P. Fischer

It is certified that error appears in the above-identified patent and that said Letters Patent are hereby corrected as shown below:

Column 26, lines 69 to 73, cancel "memory and said one ... time slot intervals." and insert -- transfer operation, data is transferred between said memory and said one peripheral device at said specified rate by the referencing of said assigned read-write control circuit during the assigned time slot intervals. --. Column 27, line 27, before "code" insert -- said --.

Signed and sealed this 30th day of November 1971.

(SEAL)
Attest:

EDWARD M.FLETCHER,JR.
Attesting Officer

ROBERT GOTTSCHALK
Acting Commissioner of Patents